Oct. 30, 1928.
W. NOBLE
1,690,029
VALVE GUIDE
Filed March 10, 1927
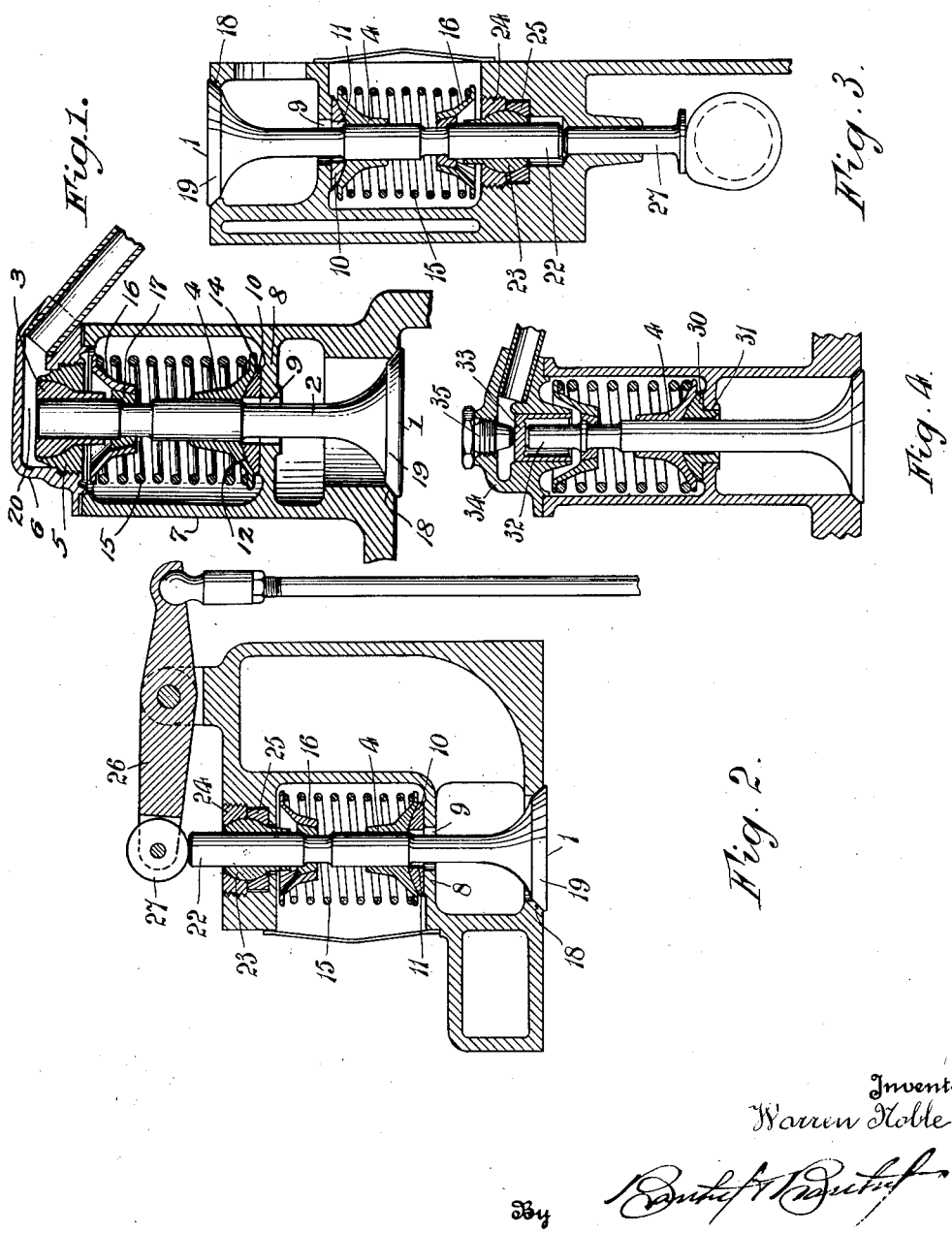
Inventor
Warren Noble
By
Attorney Patented Oct. 30, 1928.

1,690,029

UNITED STATES PATENT OFFICE.

WARREN NOBLE, OF DETROIT, MICHIGAN.

VALVE GUIDE.

Application filed March 10, 1927. Serial No. 174,294.

This invention relates to the mounting of valves in internal combustion engines and has for its object to provide for angular flexibility in the guiding of a valve in its operation whereby it may automatically compensate for variations in axial alignment which circumstances attending its operation may require.

It frequently happens that, notwithstanding initially true axial alignment between a valve stem and the valve seat, this alignment becomes disturbed as a result, in most cases, of distortion of the valve housing by heat; and, consequently, true seating of the valve is difficult to maintain, the valve not only being caused to bear unevenly in its guides but to tilt somewhat on its seat. Loss of compression in the cylinder of the engine and marked tendency to burn out the valve are characteristic of this condition.

This invention, therefore, is intended to overcome the aforesaid objectionable features of the fixedly aligned valve, and contemplates the provision of a simply constructed and easily assembled valve guide which will be self-aligning in its functions and lend itself especially to incorporation in high grade engines such as are used for aeronautical purposes.

A further object of the invention is to provide combinations with such a self-aligning guide, a form of valve and valve seat, co-operating with the said valve guide, in rendering the seating of the valve effective irrespective of distortion of the normal alignment of the valve and valve seat.

Still further objects subsidiary to or resulting from the aforesaid objects, or from the construction or operation of the invention as it may be carried into effect, will become apparent as the said invention is hereinafter further disclosed.

In carrying the said invention into effect, I may provide the stem of a poppet valve with a combination guide angularly movable about the center thereof, and a washer, intermediate the length of the stem, having lateral freedom of movement, the upper surface of said washer being spherical and supporting a correspondingly concave second guide member. A valve spring compressed by a retaining member on the valve stem presses the second guide member against the said washer. The valve and its seat have connecting spherical faces struck about a common point in advance of the valve head. All of which is more particularly described and ascertained hereinafter, by way of example, having reference to the accompanying drawings, wherein:—

Figure 1 illustrates in sectional elevation the said invention embodied in a hydraulically operated valve.

Figure 2 similarly illustrates its application to a rocker operated valve;

Figure 3 shows the application of the invention to a direct tappet operated valve; and Figure 4 illustrates in section a still further modified form of valve guiding means.

Similar characters of reference indicate similar parts in the several figures of the drawings.

1 is a poppet valve the stem 2 of which is reciprocal in guide members 3 and 4, the outer guide member 3 being in the form of a ball mounted in a socket 5 located in the head 6 of a valve casing 7 the particular design of which is immaterial to this invention. Thus the valve stem is virtually capable of universal movement about the center of the ball member 3.

Intermediate of the member 3 and the head of the valve, the valve casing is provided with a partition 8 having an orifice 9 therein through which said valve stem passes, and on this partition is supported a washer 10 slidable on said partition in a plane transverse of the valve stem, this washer having a central orifice 11 also receiving the valve stem. The orifices 9 and 11 are of greater diameter than the enclosed part of the valve stem.

The upper surface of the washer 10 is convex and forms a seat for the correspondingly concaved opposed surface 12 of a second guide member 4 in which the valve stem is slidable. This guide member 4 is provided with an annular flange 14 upon which presses the inner end of a valve spring 15 which is held in a state of compression by a spring retainer 16 secured to the valve stem by a split bushing 17 of a well known type.

The valve seat 18 has a concave or spherical surface struck about a point beyond the head of the valve, as distinguished from the usual conical seat, and the face 19 of the valve is spherical or convex in counterpart of the valve seat.

It will be seen that distortion of the surrounding metal of the valve casing or cage resulting in the axial alignment of the valve and its seat being disturbed from the normal, may be compensated for by the angular movement of the valve about the center of the member 3, which is obviously possible with the described construction, and that the proper seating of the valve head upon such angular movement taking place will be insured by the co-acting spherical meeting faces of the valve head and its seat.

It will also be apparent that the laterally movable nature of the washer 10 and the ability of the guide member 4 to tilt relative to the axis of said washer, will permit without restriction, such angular movement of the valve stem, the compression spring being movable in all directions freely with the valve stem.

As a consequence of the freedom of movement of the parts described, the valve is self-aligning to a very desirable degree, and the arrangement is capable of ready manufacture and assembly.

The valve arrangement of Figure 1 is intended for hydraulic operation, actuation being effected by pressure of fluid upon the outer end of the valve stem within a chamber 20. The method of operation of the valve is not, however, an essential feature of the present invention.

In Figure 2 the valve stem 22 is somewhat longer than in Figure 1 so that it projects beyond the outer guide member 23 which is held seated between two socket members 24 and 25. 26 is a common type of rocker provided with a roller 27. The variation in the position of the outer end of the valve stem relative to the roller in adjusting itself to altered alignment, is so small as to be negligible.

In Figure 3 the valve and its supporting parts are simply reversed and a tappet 27 is arranged to operate the valve.

In the arrangement shown in Figure 4, the fulcrum point of the valve is below the guide member 4, the convex supporting washer 30 of which is recessed into the valve casing partition 8 at 31 so that it does not have the lateral movement of the washers 10 shown in the other figures of the drawings. In this case the upper end of the valve stem 32 is housed and laterally movable in a hollow plunger 33 which is reciprocally mounted in the valve casing head 34. This arrangement is illustrated as being adapted for hydraulic operation, as in the case of the arrangement Figure 1, although it is equally adapted to mechanical operation by tappets or rockers such as are shown in Figures 2 and 3, as will be readily understood. 35 is a stop limiting the upward movement of the plunger 34.

This invention may be developed within the scope of the following claims without departing from the essential features of the said invention, and it is desired that the specifications and drawings be read as being merely illustrative and not in a limiting sense, except as necessitated by the prior art.

What I claim is:—

1. In combination with a poppet valve having a spherical seating face, a valve housing, universally mounted valve guiding means disposed towards the end of the stem of said valve, and a further universally mounted and laterally shiftable guide intermediate of the length of the stem of said valve for the puropses specified.

2. In combination with a poppet valve having a spherical seating face, a valve housing, said valve being angularly movable out of normal alignment in said housing about a fixed point remote from the head of said valve, and a guide member on the stem of said valve intermediate said point and the head of said valve, said guide member being laterally movable in said housing for the purposes specified.

3. In combination with a poppet valve having a spherical seating face, a two-point guide device comprising a guide remote from the head of said valve and a further guide towards the head of said valve, a socket bearing in which said first guide is universally movable, said further guide being also movable about the center of movement of said first guide, and yieldable means tending to maintain said further guide against axial disturbance substantially as described.

4. The combination with a poppet valve having a stem and a head formed with a spherical seating surface, a guide member for said stem remote from said head, said guide member being seated for universal movement about a fixed point in the axis of said stem, and a second guide member for said stem intermediate said first named guide member and said head, said second guide member being seated for universal movement about a point located toward said head.

5. The combination with a poppet valve having a stem and a head formed with a spherical seating surface, a guide member for said stem remote from said head, said guide member being seated for universal movement about a fixed point in the axis of said stem, a second guide member for said stem intermediate said first named guide member and said head, said second guide member being seated for universal movement about a point located toward said head, and yieldable means to hold said second guide member seated.

6. In combination with a poppet valve having a spherical seating face and a corresponding valve seat having a counterpart face, a two-point guide device including a guide having universal connection with the stem of said valve remote from the head thereof, a further guide device towards the head of the valve, including a universal connection providing a fixed point about which said valve may swing to accommodate lateral change of location of said valve seat relative to said first mentioned guide device, said further guide being movable with said valve stem, and yieldable means tending to maintain said further guide against axial disturbance.

In testimony whereof I affix my signature.

WARREN NOBLE.